3,181,960
REFRACTORY PRACTICES
Donald F. King, Pittsburgh, and Thomas William Smoot, Bethel Park, Pa., assignors to Harbison-Walker Refractories Company, Pittsburgh, Pa., a corporation of Pennsylvania
No Drawing. Filed Apr. 24, 1963, Ser. No. 275,220
4 Claims. (Cl. 106—64)

This invention relates to methods of improving the carbon monoxide resistance of certain refractory materials and especially those used for gunning. Carbon disintegration of certain refractories is well known in the metallurgical and ceramic arts. It appears that carbon monoxide, formed during a metallurgical or combustion process, enters the refractory material from which confining walls are fabricated; and therein reacts to deposit carbon according to the reaction $$2CO \rightarrow C + CO_2$$

It, further, appears that iron oxide, in the refractories which makeup such confining walls, acts as a catalyst; and the growing carbon deposits produce internal stresses in the refractory, eventually causing disruption and cracking thereof.

The reaction between iron oxide and carbon monoxide with coincident carbon deposition has been countered, in some refractory materials of the fireclay-type, by dipping or treating the brick or shapes with various water soluble chloride, sulfides or sulfates (see, for example, United States Patents Nos. 2,725,226 and 2,725,227), by beneficiation of fireclay brick starting materials to substantially eliminate iron oxide impurities, or by specialized firing of the refractory before service to neutralize the effects of the iron oxide and other detrimental impurities. Beneficiation and specialized firing considerably increase the cost of manufacturing. Dipping techniques have been accepted for certain types of refractories, but are not suitable for all types. For example, it appears the water soluble materials interfere with the ability of such as castables and refractory gunning mixes containing hydraulic cement to set and develop dry strength properly. Dry strength refers to the strength of a castable, ramming or gunning mix, after it has been formed into a desired monolithic shape and free water has been removed therefrom.

It is, therefore, an object of the invention to provide improved method of imparting to refractories resistance to attack by carbon monoxide. It is still another object of the invention to provide improved method of economically improving the carbon monoxide resistance of refractory castables, ramming mixes and gunning mixes, for such as blast furnace usage.

Briefly, according to one embodiment of this invention, an improved refractory is provided having good strength and resistance to carbon monoxide. It is comprised of a selected acid refractory such as fireclay (we considered it an inert filler material), a calcium aluminate binder, and finely divided water-insoluble elemental sulfur. It may be stated that compositions manufactured according to the methods of this invention are comprised of 0 to 90%, by weight, of such as size graded acid and/or alumina refractory aggregate filler, from 9.5 to 99.5% size graded calcium aluminate cement, and 0.5 to 5% of fine elemental sulfur. Best results are obtained when the sulfur addition is between 0.5 and 3%, by weight, of the dry solids in the mixture. Upwards of 7% can be used, but these higher amounts are not suggested, for two reasons: First, above 5%, the cost of the sulfur decreases the marketability of the product. Also, as becomes apparent hereafter, the sulfur chemically reacts with iron and calcium in the mix; and any sulfur in excess of that which reacts is merely burned off to the atmosphere in high temperature service environments. Such loss of sulfur undesirably decreases the density of the refractory. As a practical matter, to be satisfactory, we do not believe this type of refractory can have a density below 120 p.c.f., with 100 p.c.f. being an outside minimum. By keeping the sulfur addition below about 5%, we are able to keep the density above about 120 p.c.f.—all other manufacturing parameters being equal.

For optimum results, all sulfur should pass a 325 mesh screen. It is essential that the foregoing ingredients be intimately admixed, so as to uniformly distribute and disperse the finely divided sulfur through the dry solids batch. First reaction between the sulfur and iron oxide impurities and lime—which gives appreciable improved strength and resistance to carbon monoxide and natural gas attack, occurs at about 140° F. The results to improve continue as the temperature is raised to about 2600° F. by which temperature the reactions have been completed. At these temperatures, the following, at least some of the following, reactions are believed to occur:

(1) $(CaO.Al_2O_3).CaO.2Al_2O_3 + S + H_2O$
    $\rightarrow Ca(OH)_2 + Al_2O_3.H_2O + H_2O + S$
(2) $Ca(OH)_2 + S \rightarrow CaS + H_2O + O$
(3) $CaS + 3O \rightarrow CaSO_3$
(4) $CaSO_3 + S \rightarrow Ca_2SO_3$
(5) $Ca_2SO_3 + 4S \rightarrow CaS_5$ (calcium polysulfide)

For this invention, suitable chemically inert, non-basic refractory filler materials of commerce are, for example, as follows: chrome ore, calcined alumina, calcined South American bauxite, calcined Alabama bauxite, calcined diaspore, burley diaspore, kyanite, silica, ganister, quartzite, and other fireclay, silica and alumina refractory materials, aluminum ores and the like, calcium silicates, zircon, etc. Lightweight aggregates are also usable for this purpose. They include such as Haydite, vermiculite, expanded fireclay, perlite, etc. The calcium aluminate may be any suitable calcium aluminate cement, such as the cements sold in commerce and referred to as Lumnite cement, Rolandschutte cement, etc. Exemplary chemical analyses of a usable calcium aluminate cement is as follows (by weight on the basis of an oxide analysis):

Table I

| | Percent |
|---|---|
| Silica($SiO_2$) | 10 |
| Alumina($Al_2O_3$) | 42 |
| Iron oxide($Fe_2O_3$) | 5 |
| Iron(FeO) | 5 |
| Lime(CaO) | 37 |
| Magnesia(MgO) | 1 |
| Sulfite($SO_3$) | 0.2 |

The sulfur used is, preferably, technical grade flowers. It can be roll etc., crude or refined. The essential characteristic is that it be elemental sulfur, stable and solid at room temperature. Those in the art will recognize this definition to include alpha sulfur—which is characterized by rhombic, octahedral yellow crystals stable at room temperature (72° F.), and beta sulfur—monoclinic, prismatic, pale yellow crystals slowly changeable to alpha form below 94.5° C., and other elemental sulfur.

Table II shows the results of tests to establish beneficial properties for elemental sulfur additions according to the invention.

Table II

[By weight, and on the basis of an oxide analysis]

| Mix | A | B | C | D |
|---|---|---|---|---|
| Calcined rough flint clay, percent | 71 | 70 | 68 | 66 |
| Calcium aluminate cement | 18 | 18 | 18 | 18 |
| Bentonite (a plasticizer) | 1 | 1 | 1 | 1 |
| Elemental sulfur, ball mill fines (nominally all −65 mesh, 55% −150 mesh) | 0 | 1 | 3 | 5 |
| Tempering liquid, percent | +13.5 | +13.5 | +13.5 | +13.5 |
| *Physical properties of samples dried at 230° F:* | | | | |
| Density, p.c.f. | 129 | 128 | 126 | 125 |
| Modulus of rupture, p.s.i. (room temperature of about 72° F) | 690 | 900 | 1,090 | 1,020 |
| Cold crushing strength on flat, p.s.i. | 4,340 | 5,800 | 6,300 | 5,870 |

The materials used in the foregoing table have the following typical analyses:

Table III

| | Calcined rough flint clay | Calcium aluminate cement | Bentonite |
|---|---|---|---|
| $SiO_2$ | 48.4 | .2 | 65.8 |
| $Al_2O_3$ | 46.8 | 72.2 | 22.9 |
| $TiO_2$ | 2.4 | .0 | .1 |
| $Fe_2O_3$ | 1.1 | .0 | 4.0 |
| CaO | .2 | 27 | 1.3 |
| MgO | .4 | .2 | 2.8 |
| Alkalies | .7 | .4 | 3.1 |

The sulfur used in the foregoing table was a chemically pure sulfur containing about 90% alpha crystalline sulfur. The sulfur was all finely divided i.e. ball mill fine.

The grind for the mixes of Table II was typically as follows:

Table IV

| | Percent |
|---|---|
| Held 6 on 10 mesh | 30 |
| Held 10 on 28 mesh | 30 |
| Held 28 on 65 mesh | 15 |
| −65 mesh | 25 |

(Tyler Series)

Mixes B, C and D, having the sulfur, had excellent increase in cold crushing strength and modulus of rupture, directly resulting from the sulfur addition. Samples made from mixes A through D were subjected to comparative testing in an equivalent carbon monoxide atmosphere. The testing was substantially that of ASTM Method C–288–56, except the samples were not preheated. Mix A, the standard, cracked after 200 hours, and substantially disintegrated because of extensive carbon deposition at 500 hours. Testing was repeated strictly according to ASTM Method C–288–56. Mix A disintegrated by 50 hours. Mixes B, C and D were "slightly" affected, by ASTM Standards, after 100 hours in the latter test, but were unaffected in the former tests after 500 hours. The other samples withstood the test well. In other tests, mixes B, C and D were duplicated, substituting the less pure calcium aluminate cement of Table I for that of Table III. The less pure calcium aluminate cement gave uniformly higher modulus of rupture and cold crushing strength in the resulting product. The numerical results are set forth in Table V. Note, also, the density increased.

Table V

| | B–1 | C–1 | D–1 |
|---|---|---|---|
| *Air dried, 230° F, 16 hours:* | | | |
| Density, p.c.f. | 136 | 137 | 135 |
| Modulus of rupture, p.s.i. | 1,390 | 1,740 | 1,330 |
| Cold crushing strength, p.s.i. | 6,600 | 6,690 | 6,900 |

The increased strength and density are believed the result of chemical reaction between the iron oxide in the cement, and the sulfur to provide some manner of bond.

In the carbon monoxide test the Table V samples exhibited resistance to carbon monoxide comparable to the resistance of Mixes B, C, and D in Table II.

In all of the foregoing tests, as reported in Tables II and V, technical grade flower sulfur was used. Table VI shows the results of testing, in which technical grade roll sulfur was used. The mixes tested were, in all respects, the same as those in Tables II and V, except for the change in the form of the sulfur.

Table VI

| | A–2 | B–2 | C–2 | D–2 |
|---|---|---|---|---|
| Rolled sulfur added, percent | 0 | 1½ | 2 | 2½ |
| Density, p.c.f. (dry) | 129 | 128 | 129 | 132 |
| Modulus of rupture, p.s.i. (dry) | 1,180 | 1,400 | 1,390 | 1,660 |

In a natural gas cracking test (can be termed a methane gas resistance test), the standard (A–2) disintegrated; the others were not affected. This is of interest to the petrochemical industry. The test is substantially as described in the article "A Study of the Effect of Natural Gas and of Hydrogen Upon Various Refractories," Ruprecht, et al., Journal of The American Ceramic Society, Vol. 17, No. 7, July 1934.

A batch is prepared in which the calcined rough flint fire clay of Table II is replaced with size graded tabular alumina, to obtain an overall size grading substantially as set forth in Table IV. Modulus of rupture, dry, increases on the order of 1000 p.s.i. and modulus of rupture at 2730° F. increases on the order of 500 p.s.i., both as compared to B, C and D mixes of Table II. In a like manner, other high alumina fireclay and acid refractories can be substituted for the filter material, such as the calcined rough flint clay, of Table II.

It is, likewise, possible, particularly for certain operations, to use a size graded calcium aluminate cement for 95 to 99.5% of the dry solids. However, size graded in this instance means trace on a 150 mesh screen, 15% on 200 mesh, the remainder passing the 200 mesh screen.

In the foregoing discussion all parts and percentages are by weight, all chemical analyses are on the basis of an oxide analysis unless specifically stated to the contrary, all sizing is according to the Tyler standard screen series.

Having thus described the invention in detail and with sufficient particularity as to enable those skilled in the art to practice it, what is desired to have protected by Letters Patent is set forth in the following claims.

We claim:

1. The method of improving the carbon monoxide and natural gas resistance of certain refractories which comprises forming a refractory batch mixture of 0 to 90% of size graded non-basic filler material substantially chemically inert to the other ingredients in the batch, from 9.5 to 99.5% of calcium aluminate cement and from 0.5 to 7% of finely divided elemental sulfur, uniformly dispersing the finely divided sulfur throughout the dry solids batch, tempering the batch, forming the batch, heating the batch at a temperature of at least about 140° F. to chemically react the sulfur with iron oxide impurities and lime, whereby the resistance of the formed batch to carbon monoxide and natural gas attack is improved.

2. The method of claim 1 in which the sulfur is −325 mesh.

3. The method of claim 2 in which the calcium aluminate cement is −65 mesh.

4. The method of improving the carbon monoxide and natural gas resistance of certain refractories which comprises, forming a refractory batch mixture of from 0 to 90%, by weight, of size graded refractory material of the group consisting of chrome ore, calcined alumina, calcined South American bauxite, calcined Alabama bauxite, calcined diaspore, burley diaspore, kyanite, silica, ganister, quartzite, fire-clay, calcium silicates, zircon, Haydite, perlite, vermiculite, expanded fireclay aggregate, and mixtures thereof, from 9.5 to 99.5%, by weight, of calcium aluminate cement, and from 0.5 to 7%, by weight, of finely divided elemental sulfur, uniformly dispersing the finely divided sulfur throughout the dry solids batch, tempering the batch, forming the batch, heating the batch at a temperature of at least about 140° F. to chemically react the sulfur with iron oxide impurities and lime, whereby the resistance of the formed batch to carbon monoxide and natural gas is improved.

References Cited by the Examiner
UNITED STATES PATENTS

| | | | |
|---|---|---|---|
| 1,351,617 | 8/20 | Butty et al. | 106—70 |
| 1,808,081 | 6/31 | Sullivan | 106—70 |

TOBIAS E. LEVOW, *Primary Examiner.*